US011265340B2

(12) United States Patent
Ward et al.

(10) Patent No.: US 11,265,340 B2
(45) Date of Patent: *Mar. 1, 2022

(54) EXCEPTION REMEDIATION ACCEPTABLE USE LOGIC PLATFORM

(71) Applicant: BANK OF AMERICA CORPORATION, Charlotte, NC (US)

(72) Inventors: Julia A. Ward, Charlotte, NC (US); Jonathan Michael Nauss, Charlotte, NC (US); Peter Jordan Langsam, San Francisco, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 484 days.

This patent is subject to a terminal disclaimer.

(21) Appl. No.: 15/889,789

(22) Filed: Feb. 6, 2018

(65) Prior Publication Data
US 2019/0245878 A1 Aug. 8, 2019

(51) Int. Cl.
*H04L 29/06* (2006.01)

(52) U.S. Cl.
CPC ...... *H04L 63/1433* (2013.01); *H04L 63/1441* (2013.01); *H04L 63/20* (2013.01)

(58) Field of Classification Search
CPC .. H04L 63/1433; H04L 63/20; H04L 63/1441
See application file for complete search history.

(56) References Cited

U.S. PATENT DOCUMENTS

| 6,711,571 | B2 | 3/2004 | Putzolu |
| 7,000,247 | B2 | 2/2006 | Banzhof |
| 7,448,066 | B2 | 11/2008 | Birk et al. |
| 7,529,981 | B2 | 5/2009 | Childress et al. |
| 7,574,740 | B1 | 8/2009 | Kennis |
| 7,607,164 | B2 | 10/2009 | Vasishth et al. |
| 7,665,119 | B2 | 2/2010 | Bezilla et al. |
| 7,668,947 | B2 | 2/2010 | Hutchinson et al. |
| 7,698,275 | B2 | 4/2010 | O'Brien et al. |
| 7,698,391 | B2 | 4/2010 | Paliwal et al. |
| 7,711,683 | B1 | 5/2010 | Watanabe et al. |

(Continued)

*Primary Examiner* — Brian F Shaw
(74) *Attorney, Agent, or Firm* — Moore & Van Allen PLLC; Jeffrey R. Gray (57) ABSTRACT

The invention relates generally to monitoring and managing network components, such as monitoring the network components to determine the vulnerabilities of network components, implementing remediation plans for the vulnerabilities, instituting remediation suppression for the vulnerabilities, and taking consequence actions for the vulnerabilities when remediation is no longer suppressed and fails to be implemented. Remediation suppression may be implemented for the vulnerability when the vulnerability is determined to be an acceptable vulnerability. The remediation suppression may be based on a request from a user, based on organization policy, and/or based on logic determining that the vulnerability is acceptable. When the remediation suppression occurs at least a part of the remediation plan, consequence action, and/or reporting is suppressed. While suppression may occur, the remediation suppression, the vulnerabilities, the organization's policies, and/or the network components may still be monitored to monitor changes will change the suppression of the vulnerabilities.

20 Claims, 3 Drawing Sheets

(56) References Cited

U.S. PATENT DOCUMENTS

| | | | |
|---|---|---|---|
| 7,761,920 B2 | 7/2010 | Bezilla et al. | |
| 7,774,848 B2 | 8/2010 | D'Mello et al. | |
| 7,818,788 B2 | 10/2010 | Meier | |
| 7,962,696 B2 | 6/2011 | Steely, Jr. et al. | |
| 7,962,960 B2 | 6/2011 | Fudge | |
| 7,992,033 B2 | 8/2011 | Childress et al. | |
| 8,224,937 B2 | 7/2012 | Childress et al. | |
| 8,291,093 B2 | 10/2012 | Choe | |
| 8,341,691 B2 | 12/2012 | Bezilla et al. | |
| 8,375,113 B2 | 2/2013 | Sinn et al. | |
| 8,561,134 B2 | 10/2013 | Bezilla et al. | |
| 8,561,175 B2 | 10/2013 | Williams et al. | |
| 8,613,080 B2 | 12/2013 | Wysopal et al. | |
| 8,769,412 B2 | 7/2014 | Gill et al. | |
| 8,776,170 B2 | 7/2014 | Bezilla et al. | |
| 8,924,577 B2 | 12/2014 | Choe | |
| 8,984,586 B2 | 3/2015 | Bezilla et al. | |
| 8,984,643 B1 | 3/2015 | Krisher et al. | |
| 9,100,431 B2 | 8/2015 | Oliphant et al. | |
| 9,154,523 B2 | 10/2015 | Bezilla et al. | |
| 9,253,202 B2 | 2/2016 | Thakur | |
| 9,270,695 B2 | 2/2016 | Roytman et al. | |
| 9,436,820 B1 | 9/2016 | Gleichauf et al. | |
| 9,467,464 B2 | 10/2016 | Gula et al. | |
| 9,483,281 B2 | 11/2016 | Bonczkowski et al. | |
| 9,706,410 B2 | 7/2017 | Sreenivas et al. | |
| 9,727,728 B2 | 8/2017 | Avrahami et al. | |
| 2004/0128370 A1* | 7/2004 | Kortright | H04L 69/329 709/221 |
| 2005/0044418 A1 | 2/2005 | Miliefsky | |
| 2005/0216957 A1 | 9/2005 | Banzhof et al. | |
| 2005/0229256 A2 | 10/2005 | Banzhof | |
| 2006/0010497 A1 | 1/2006 | OBrien et al. | |
| 2006/0191012 A1* | 8/2006 | Banzhof | G06Q 40/025 726/25 |
| 2006/0195905 A1* | 8/2006 | Fudge | G06F 21/577 726/25 |
| 2010/0130178 A1 | 5/2010 | Bennett et al. | |
| 2010/0216429 A1 | 8/2010 | Mahajan | |
| 2010/0242114 A1* | 9/2010 | Bunker | G06F 21/577 726/25 |
| 2011/0225275 A1 | 9/2011 | Shah et al. | |
| 2012/0046985 A1 | 2/2012 | Richter et al. | |
| 2013/0007865 A1 | 1/2013 | Krishnamurthy et al. | |
| 2013/0091534 A1 | 4/2013 | Gilde et al. | |
| 2014/0331326 A1 | 11/2014 | Thakur | |
| 2015/0281287 A1 | 10/2015 | Gill et al. | |
| 2015/0288709 A1 | 10/2015 | Singhal et al. | |
| 2016/0253364 A1 | 9/2016 | Gomadam et al. | |
| 2017/0220808 A1 | 8/2017 | Schmidt et al. | |
| 2017/0279799 A1 | 9/2017 | Baltzer et al. | |
| 2018/0096260 A1 | 4/2018 | Zimmer et al. | |
| 2018/0144139 A1 | 5/2018 | Cheng et al. | |
| 2019/0087832 A1 | 3/2019 | Mercury et al. | |
| 2019/0098028 A1 | 3/2019 | Ektare et al. | |
| 2019/0166149 A1* | 5/2019 | Gerrick | G06F 21/562 |
| 2019/0245878 A1 | 8/2019 | Ward et al. | |
| 2019/0245879 A1 | 8/2019 | Ward et al. | |
| 2019/0245880 A1 | 8/2019 | Ward et al. | |

\* cited by examiner

EXCEPTION REMEDIATION ACCEPTABLE USE LOGIC PLATFORM

FIELD

The present invention relates to identifying vulnerabilities in network components, and more particularly to determining remediation exceptions for vulnerabilities and suppressing the reporting of the vulnerabilities.

BACKGROUND

Organizations utilize numerous network components (e.g., network devices, network applications, or the like) for the organization's operations. However, due to the large number of network components, opportunities are created for the occurrence of accidental or purposeful vulnerabilities in the network components. The vulnerabilities may be general vulnerabilities that are potential issues for all types of organizations regardless of the organization type, or may be specific vulnerabilities that are based on the organizations' specific uses and/or specific policies for the organizations' own network components. There exists a need to manage the vulnerabilities within an organization.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Generally, systems, computer products, and methods are described herein for improved monitoring and management of network components, including monitoring the network components to determine the vulnerabilities of network components, implementing remediation plans for the vulnerabilities, instituting remediation suppression for acceptable uses, instituting network component exceptions and rolling exceptions for network components, taking consequence actions for the vulnerabilities, and/or the like. The present invention provides an organization improved control over its network components, thus improving the security for an organization, by providing improved network component information collection and network component decisioning in order to remediate the vulnerabilities. The security of the network components is improved by allowing the organization to remotely monitor the network components for vulnerabilities and remotely control the network components (e.g., freeze at least a potion thereof, limit or prevent operation of the network component in a number of different ways, or the like). Additionally, the present invention provides improved efficiency in monitoring and taking actions with respect to the network components because the monitoring and control of the network components may occur remotely.

Embodiments of the invention relate to first determining the primary user 4 or owner of the network components (e.g., is listed as the owner, the user that is responsible for the network component, the user the uses the network component the most, the user that accesses the network component the most, or the like). Thereafter, the network components are monitored to identify vulnerabilities in the network components. Next, a remediation plan may be implemented, which may include alerting the primary user 4 of the vulnerability, automatically and remotely freezing at least a portion of the network component, providing processes for remediating the vulnerability, providing updates for network components to remove the vulnerability, or the like.

It in some embodiments of the invention, remediation suppression may be implemented for the user 4, vulnerability, network component, or the like when the vulnerability is determined to be an acceptable vulnerability. For example, the remediation suppression may be implemented when the user 4 requests an exception and it is granted, when an exception is granted based on organization policy, and/or when an exception is granted based on third party information. When remediation suppression is implemented the reporting of the vulnerability may be prevented). As such, even though a vulnerability has occurred, the vulnerability may be acceptable and thus at least a portion of the remediation process may be suppressed, the reporting of the vulnerability may be suppressed in order to prevent false notifications of the vulnerabilities, and/or any consequence actions associated with the vulnerability may be suppressed. It should be understood that while the reporting of the vulnerabilities may be suppressed, the remediation suppression, the vulnerabilities, the organization's policies, and/or the network components may still be monitored to make sure changes have not occurred that will change the suppression of the vulnerabilities. For example, the network components may be monitored to make sure company policy does not change that would make the suppression no longer valid, that the network components may have changed such that the network components may no longer have vulnerabilities, and/or the vulnerabilities are no longer considered vulnerabilities.

Alternatively, or in addition to remediation suppression, customized criteria may be created and used to identify rolling network component exceptions that automatically prevent identification and/or remediation of vulnerabilities for particular network components. It should be understood that the customized criteria may be set up by a user or automatically identified by the organization systems. If any current network component or new network components meets the customized criteria, the network component may be automatically rolled into network component exceptions processes in order to prevent a vulnerability action, such as identification of a vulnerability for the network component or remediation of the vulnerability for the network component.

Embodiments of the invention comprise systems, computer implemented methods, and computer program products for suppressing remediation of vulnerabilities of network components based on acceptable vulnerabilities. The invention comprises monitoring network components for vulnerabilities. A vulnerability is identified, and wherein the vulnerability is related to at least one of the network components. Identify when the vulnerability is an acceptable vulnerability and tag the acceptable vulnerability with a remediation suppression. The remediation suppression results in suppressing at least a portion of a remediation plan, a consequence action, or reporting for the acceptable vulnerability. Monitoring of the network components and the acceptable vulnerability is continued in order to determine a change for the remediation suppression.

In further accord with embodiments of the invention, suppressing at least the portion of the reporting for the acceptable vulnerability comprises preventing reporting of the acceptable vulnerability in order to prevent a false reporting of the vulnerability.

In other embodiments of the invention, suppressing at least the portion of the remediation plan comprises suspending alerts to a primary user of a network component impacted by the acceptable vulnerability.

In still other embodiments of the invention, suppressing at least the portion of the remediation plan comprises altering a remediation deadline for remediating the acceptable vulnerability.

In yet other embodiments of the invention, suppressing at least the portion of the remediation plan comprises suspending prevention of operation of at least a portion of the network component impacted by the acceptable vulnerability.

In further accord with embodiments of the invention, suppressing implementation of the consequence action comprises suspending removal of a network component impacted by the acceptable vulnerability.

In other embodiments of the invention, determining when the vulnerability is the acceptable vulnerability comprises determining when a user exception request for the vulnerability has been approved.

In still other embodiments of the invention, determining when the vulnerability is the acceptable vulnerability comprises determining when the vulnerability is acceptable based on organization policy.

In yet other embodiments the invention further comprises determining when the acceptable vulnerability is no longer acceptable based on a change in the organization policy, and untagging the remediation suppression from the acceptable vulnerability when the acceptable vulnerability is no longer acceptable based on the change in the organization policy.

In other embodiments the invention further comprises determining when the acceptable vulnerability ceases to exist based on a change to one or more of the network components, an untagging the remediation suppression from the acceptable vulnerability when the vulnerability ceases to exist based on the change to the one or more of the network components.

In still other embodiments the invention further comprises editing the remediation suppression when a change in one or more of the network components or an organization policy occurs, wherein editing the remediation suppression comprises changing the suppression of at least the portion of the remediation plan, the consequence actions, or the reporting for the acceptable vulnerability.

In yet other embodiments the invention further comprises determining when the remediation suppression is untagged from the acceptable vulnerability; determining the remediation plan for the vulnerability for the at least one of the network components; implementing the remediation plan for the at least one of the network components; monitoring the at least one of the network components for compliance with the remediation plan; identifying a trigger for implementing the consequence action for the at least one of the network components; and implementing the consequence action for the at least one of the network components when the trigger is identified.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Having thus described embodiments of the invention in general terms, reference will now be made to the accompanying drawings, and wherein:

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Systems, methods, and computer program products are herein disclosed that monitor and manage network components, including determining the vulnerabilities of network devices and network applications, implementing remediation plans for the vulnerabilities, identifying exceptions for the vulnerabilities, suppressing reporting of the vulnerabilities, and taking consequence actions based on the vulnerabilities (e.g., suspending, blocking, removal, or the like of the network components).

Figure 1:
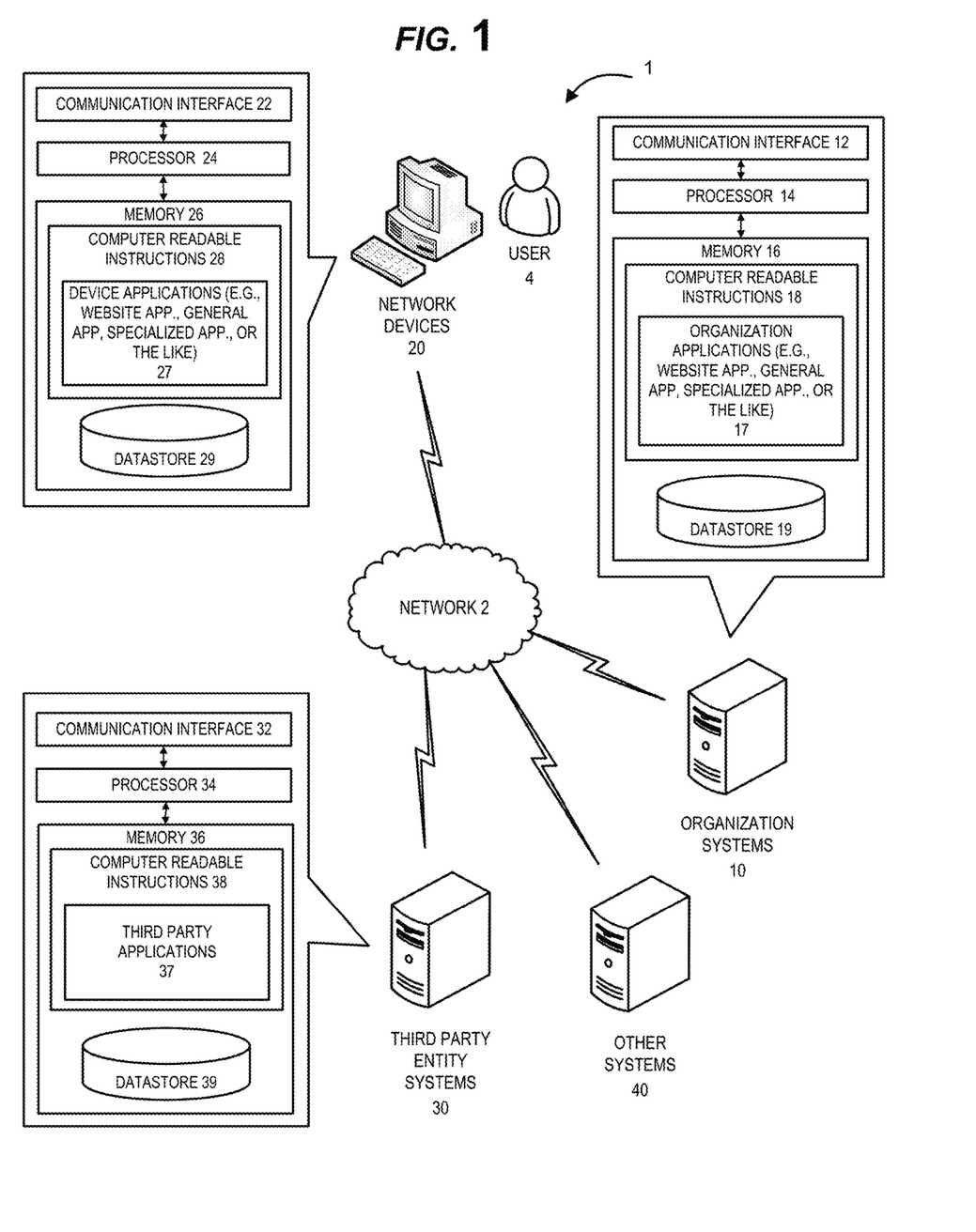
FIG. 1 illustrates a block diagram of a network device vulnerability system environment, in accordance with one or more embodiments of the invention.

FIG. 1 illustrates a network device vulnerability system environment 1, in accordance with embodiments of the invention. As illustrated in FIG. 1, one or more organization systems 10 are operatively coupled, via a network 2, to one or more network devices 20, one or more third-party systems 30, and/or one or more other systems 40. In this way, a user 4 (e.g., one or more associates, employees, agents, contractors, sub-contractors, third-party representatives, customers, or the like), may be associated with network components (e.g., network devices and/or network applications). It should be understood that the users 4 may be described as a primary user or owner of the network component (e.g., a user that "owns" the network component, a user that is responsible for a specific network component, a user that uses the network component the most, a user that uses the network component during a particular time period, or the like). As such the one or more organization systems 10 may be utilized to monitor the one or more network devices 20 (e.g., the network device hardware, network applications associated therewith, or the like), the one or more third party systems 30, and/or the other systems 40, and thereafter determine or take actions (e.g., remediation plan implementation, consequence actions, exception routing, exception suppression, or the like) for the one or more network devices 20, the one or more third party systems 30, and/or the other systems 40 (or applications thereof), as will be discussed in further detail herein. As such, embodiments of the present invention allow for increased security of the organization's network components using more efficient processes.

The network 2 illustrated in FIG. 1 may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 1, the one or more organization systems 10 generally comprise one or more communication interfaces 12, one or more processors 14, and one or more memories 16. The one or more processors 14 are operatively coupled to the one or more communication interfaces 12 and the one or more memories 16. As used herein, the term "processor" generally includes circuitry used for implementing the communication and/or logic functions of a particular system. For example, a processor 14 may include a digital signal processor, a microprocessor, and various analog-to-digital converters, digital-to-analog converters, and other support circuits and/or combinations of the foregoing. Control and signal processing functions of the system are allocated between these processors according to their respective capabilities. The one or more processors 14 may include functionality to operate one or more software programs based on computer-readable instructions 18 thereof, which may be stored in the one or more memories 16.

The one or more processors 14 use the one or more communication interfaces 12 to communicate with the network 2 and other components on the network 2, such as, but not limited to, the one or more network devices 20, the one or more third-party systems 30, or one or more other systems 40. As such, the one or more communication interfaces 12 generally comprise a wireless transceiver, modem, server, electrical connection, electrical circuit, or other component for communicating with other components on the network 2. The one or more communication interfaces 12 may further include an interface that accepts one or more network interface cards, ports for connection of network components, Universal Serial Bus (USB) connectors and the like.

As further illustrated in FIG. 1, the one or more organization systems 10 comprise computer-readable instructions 18 stored in the one or more memories 16, which in one embodiment includes the computer-readable instructions 18 of organization applications 17 (e.g., web-based applications, dedicated applications, specialized applications, or the like that are used to monitor, communicate with, and/or take actions with respect to the various network device hardware or software). In some embodiments, the one or more memories 16 include one or more data stores 19 for storing data related to the one or more organization systems 10, including, but not limited to, data created, accessed, and/or used by the one or more organization applications 17. The one or more organization applications 17 may be applications that are specifically used to monitor the network devices 20 and network applications 27, communicate with the network devices 20 and network applications 27, and take actions with respect to the network devices 20 and network applications 27 (e.g., remediate the vulnerabilities, allow for exceptions when requested, suppress the exceptions for reporting, and/or take consequence actions with respect to the network components, as will be described herein).

As illustrated in FIG. 1, users 4 may be associated with one or more of the network components (e.g., network devices 20, network applications 27, or the like). In some cases the users 4 may be primary users, such as uses associated (e.g., owner) with one or more network components, may be the users responsible for the one or more network components, or the like. Alternatively, in some cases the one or more network components may include user computer systems that allow the users 4 to communicate with and/or through the one or more organization systems 10. That is, in some cases, the users 4 may utilize the user computer systems to monitor the one or more network components (e.g., network devices 20, network applications 27, or the like) and/or take actions with respect to the one or more network components (e.g., network devices 20, network applications 27). Additionally, the user computer systems may also be considered one of the network components. As such, it should be understood that the one or more network components may be any type of device, such as a desktop, mobile device (e.g., laptop, smartphone device, PDA, tablet, watch, wearable device, or other mobile device), server, or any other type of system hardware that generally comprises one or more communication interfaces 22, one or more processors 24, and one or more memories 26, and/or the network components may include network applications 27 used by any of the foregoing, such as web browsers applications, dedicated applications, specialized applications, or portions thereof.

The one or more processors 24 are operatively coupled to the one or more communication interfaces 22, and the one or more memories 26. The one or more processors 24 use the one or more communication interfaces 22 to communicate with the network 2 and other components on the network 2, such as, but not limited to, the one or more organization systems 10, the one or more third-party systems 30, and/or the one or more other systems 40. As such, the one or more communication interfaces 22 generally comprise a wireless transceiver, modem, server, electrical connection, or other component for communicating with other components on the network 2. The one or more communication interfaces 22 may further include an interface that accepts one or more network interface cards, ports for connection of network components, Universal Serial Bus (USB) connectors and the like. Moreover, the one or more communication interfaces 22 may include a keypad, keyboard, touch-screen, touchpad, microphone, speaker, mouse, joystick, other pointer, button, soft key, and/or other input/output(s) for communicating with the users 4.

As illustrated in FIG. 1, the one or more network devices 20 may have computer-readable instructions 28 stored in the one or more memories 26, which in one embodiment includes the computer-readable instructions 28 for network device applications 27, such as dedicated applications (e.g., apps, applet, or the like), portions of dedicated applications, a web browser or other applications that allow the one or more network devices 20 to operate, that allow users 4 to take various actions using the network devices 20, or the like. For example, the users 4 may take actions with respect to one or more network devices 20, and/or may allow the users 4 to access applications located on other systems, or the like. In some embodiments, the users 4 utilize the one or more network devices 20 in the users' daily operations and/or the users 4 may utilize the one or more network devices 20 (e.g., user computer systems 20) to interact with the organization systems 10, other one or more network devices 20 (or applications 27 thereof), the one or more third-party systems 30, and/or the one or more other systems 40.

As illustrated in FIG. 1, the one or more third-party systems 30 may communicate with the one or more organization systems 10 and/or the one or more network devices 20 directly or indirectly (e.g., through the organization). The one or more third party systems 30, and/or third-party applications 37 thereof, may provide services for the one or more network devices 20 and/or the one or more organization systems 10. As such, the one or more third-party systems 30 are operatively coupled, via a network 2, to the one or more organization systems 10, the one or more network devices 20, and/or the other systems 40. The one or more third-party systems 30 generally comprise one or more communication interfaces 32, one or more processors 34, and one or more memories 36.

The one or more processors 34 are operatively coupled to the one or more communication interfaces 32, and the one or more memories 36. The one or more processors 34 use the one or more communication interfaces 32 to communicate with the network 2 and other components on the network 2, such as, but not limited to, the one or more organization systems 10, the one or more network devices 20, and/or the one or more other systems 40. As such, the one or more communication interfaces 32 generally comprise a wireless transceiver, modem, server, electrical connection, or other component for communicating with other components on the network 2. The one or more communication interfaces 32 may further include an interface that accepts one or more network interface cards, ports for connection of network components, Universal Serial Bus (USB) connectors and the like.

As illustrated in FIG. 1, the one or more third-party systems 30 may have computer-readable instructions 38 stored in the one or more memories 36, which in some embodiments includes the computer-readable instructions 38 of one or more third party applications 37 that provide services to the one or more network devices 20 and/or the one or more organization systems 10. The access to the one or more third-party systems 30, or applications thereof, may be controlled by the one or more organization systems 10 and/or the one or more network devices 20, as will be described herein.

Moreover, as illustrated in FIG. 1, the one or more other systems 40 may be operatively coupled to the one or more organization systems 10, the one or more network devices 20, and/or the one or more third-party systems 30, through the network 2. The other like systems have features that are the same as or similar to the features described with respect to the one or more organization systems 10, the one or more network devices 20, and/or the one or more third-party systems 30 (e.g., one or more communication interfaces, one or more processors, and one or more memories with computer-readable instructions of one or more applications, one or more datastores, or the like). Thus, the one or more other systems 40 communicate with the one or more organization systems 10, the one or more network devices 20, the one or more third-party systems 30, and/or each other in same or similar way as previously described with respect to the organization systems 10, the network devices 20, and/or the third-party systems 30.

Figure 2:
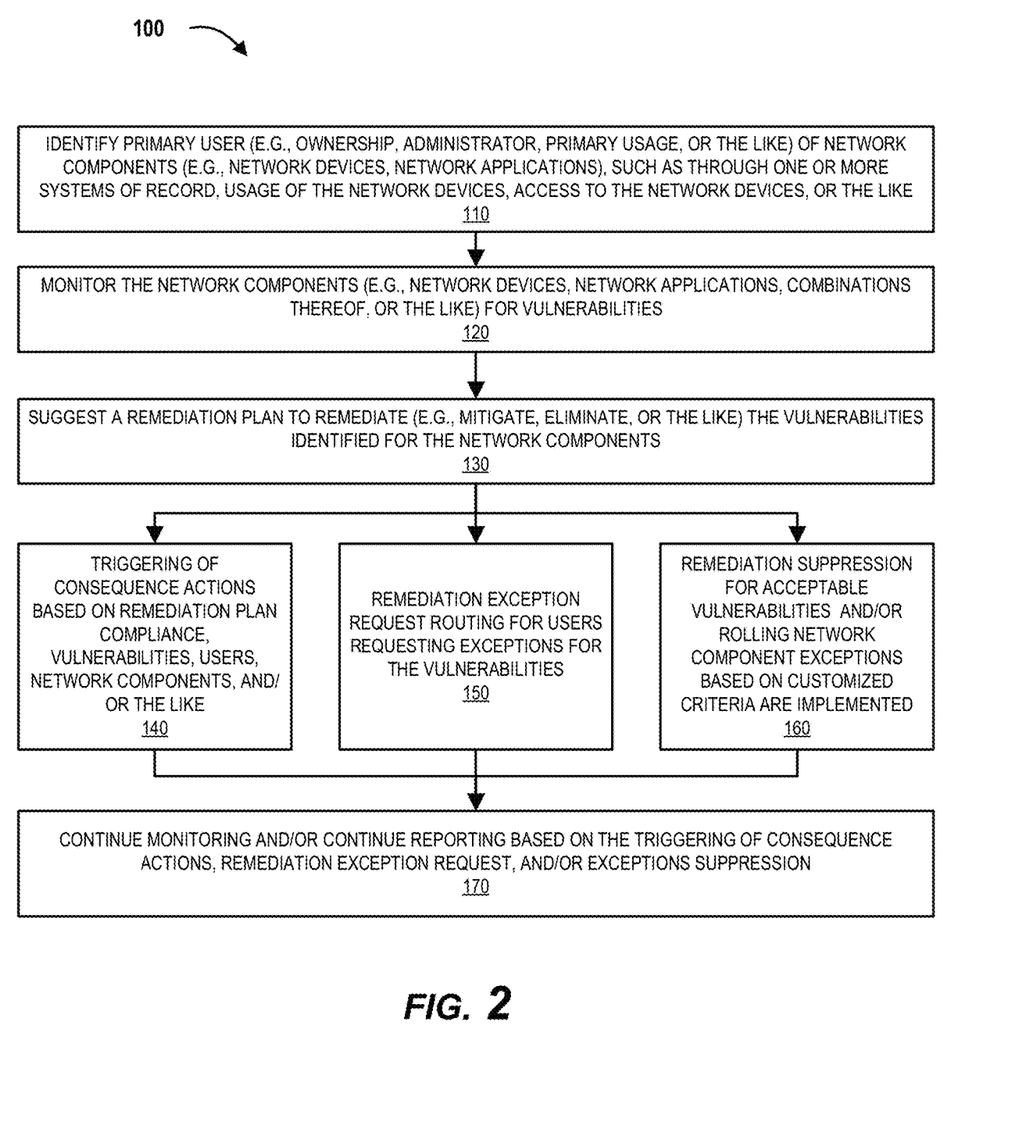
FIG. 2 illustrates a high level process flow for determining and decisioning network device vulnerabilities, in accordance with one or more embodiments of the invention.

FIG. 2 illustrates a high level process flow for monitoring network components (e.g., network devices 20, network applications 27, combinations thereof, or the like), and suggesting remediation plans, identifying triggering for consequence actions for the network components, allowing for remediation exceptions and remediation suppression, and/or the like in response to identifying vulnerabilities with the network components. As illustrated in block 110 of FIG. 2, the primary user (e.g., owner assigned to the network component, administer, person with primary operation of the network components, and/or the like) of the network components may first be determined (e.g., identified from one or more systems of record, assigned based on the network component usage, assigned based on network component access, and/or the like). As will be described in further detail herein, the primary user may be determined by accessing one or more systems of record that store primary user details for the network components (e.g., network devices 20, network applications, or the like). It should be understood that if two or more systems of record conflict with each other, or do not include network component information regarding a primary user, the present invention may assign ownership to a user 4 based on the users 4 that access the network components, use of the network components, network traffic for the network components, or otherwise users 4 that can be tied to the network elements through electronic data. It should be understood that the identification of the primary user is described in further detail with respect to U.S. patent application Ser. No. 15/889,944 entitled "Network Device Owner Identification and Communication Triggering System" filed concurrently herewith, which is incorporated by reference in its entirety herein.

Block 120 of FIG. 2 illustrates that the network components are monitored for vulnerabilities. It should be understood that vulnerabilities of network components may be any type of vulnerabilities, such as but not limited to, data security breaches, unauthorized access, data that has been copied, elements that do not utilize passwords, elements that do not utilize additional authentication factors, devices that include eavesdropping, malware, spyware, ransomware, Trojan horses, viruses, worms, rootkits, bootkits, keylogger, screen scrapers, vulnerability attacks, backdoors, logic bombs, payloads, denial of services software, elements do not have up-to-date software, allows downloading of data onto external drives, does not utilize screen locks, timed locks, or other electronic locking, systems that do not scan incoming or outgoing data, does not comply with physical security (e.g., is not properly stored, has been removed without authorization), does not have location determination activated, have applications downloaded without authorization, interacts with restricted hardware or software, accessed unsecure websites (e.g., that do not use encryption, or do not use https URLs). It should be understood that the vulnerabilities may be universal vulnerabilities that are general to all organizations, and/or may be specific to the organization (e.g., specific policy vulnerabilities for the organization as a whole or for a specific subset of the organization, such as a line of business, group, or the like). As such, the vulnerabilities may be general outside vulnerabilities to the network components, or specific policies of the organization that a network component and/or user 4 thereof may be violating. It should be understood that the vulnerabilities being monitored may be set by the organization and/or may be set by the third-party providing the network components (e.g., providing the network devices 20 and/or applications thereof). As will be discussed in further detail herein, the network components may be monitored automatically by the organization systems 10 and/or user computer systems in order to determine any vulnerabilities. The monitoring of the network components is discussed in further detail with respect to FIG. 3.

Block 130 of FIG. 2 illustrates that each of the vulnerabilities may have an associated remediation plan (e.g., a predetermined remediation plan, a plan developed based on the vulnerability, or the like). The proposed remediation plan may be suggested automatically based on the network elements, the user 4 associated with the network elements, the vulnerabilities, and/or the like, as will be discussed in further detail herein. The remediation plan suggested may include a notification to the primary user (e.g., owner, or the like) of the network component to remediate the vulnerability identified (e.g., mitigate, remove, update, or the like the vulnerability). The remediation plan may also include process steps (e.g., a procedure for remediating the vulnerability), updates (e.g., software updates), links thereto, or the like that can be utilized by the user 4 (e.g., primary user, or another user) to remediate the vulnerability. The notification may include a deadline for implementing the remediation plan and/or a deadline for completing remediation of the vulnerability. The suggestion of the remediation plan will be discussed in further detail with respect to FIG. 3.

Block 140 of FIG. 2 further illustrates that a trigger may occur if the remediation plan of the network component is not followed. As such, there may be a triggering of one or more consequence actions for the network component and/or primary user associated therewith. In some embodiments, the network components (e.g., network device, network application, combination thereof) may be suspended (e.g., at least a portion thereof may be prevented from operation, frozen, or the like) after a vulnerability is first identified. In some embodiments suspension of the network component, or portion thereof, may occur before and/or when the remediation is suggested, or in other embodiments, if the user 4 does not implement the suggested remediation plan before a particular remediation deadline. That is, a user 4 (e.g., an owner, or other user 4 using the network components) may be prevented from using the network components (e.g., the network device, network application, application accessed through the network device, portions thereof, or the like) until the vulnerability is remediated. As will be discussed in further detail later, in some embodiments of the invention, if the remediation is not implemented, for example, before a particular remediation deadline, a consequence action may be implemented. The consequence action my include removing the network component (e.g., disconnecting from the network, blocking access to the network 2, uninstalling, deactivating, powering down, or the like) as will be discussed in further detail herein.

Block 150 illustrates that in some embodiments, a user 4 may request a remediation exception for the identified vulnerability. That is, the user 4 may request an exception to allow for the continued use of the network component with the presence of the identified vulnerability (e.g., unfreeze the network component, prevent implementation of the remediation plan, and/or prevent the consequence action for the network component). For example, if the network component violates the organization policy, but is needed for a specific reason or falls within an exclusion, the user 4 may request continued use of the network component with the vulnerability without implementing the remediation plan. It should be understood that the remediation exception request routing is described in further detail with respect to U.S. patent application Ser. No. 15/889,949 entitled "Exception Remediation Logic Routing and Suppression Platform" filed concurrently herewith, which is incorporated by reference in its entirety herein.

Block 160 of FIG. 2 illustrates that in some embodiments, in response to the remediation exception, reporting of the associated vulnerability for the network component may be suppressed in order to prevent the implementation of the remediation plan and/or consequence actions for the vulnerability. Suppression of the reporting, the remediation plan, and/or the consequence actions may occur when the user 4 requests an exception and it is granted, when a remediation suppression is automatically granted based on organization policy, or the like. As such, reporting of the vulnerability may be prevented in order to prevent false notifications of the vulnerabilities (e.g., prevent unneeded reporting of the vulnerability if the vulnerability has been allowed). It should be understood that while the reporting of the vulnerabilities may be suppressed, the remediation suppressions, vulnerabilities, users 4, and/or network components may still be monitored to make sure changes have not occurred that will change the suppression of the vulnerabilities, the remediation plan, and/or the consequence actions. For example, the organization policies may be monitored in order to make sure policy changes do not occur that would result in the removal of the remediation suppression (e.g., the remediation suppression is no longer valid and is rescinded). It should be understood that the remediation suppression for acceptable vulnerabilities is described in further detail herein with respect to FIG. 3.

Additionally, or alternatively with respect to block 160, the present disclosure indicates that instead of or in addition to remediation suppression, customized criteria may be created and used to identify rolling network component exceptions that automatically prevent remediation of vulnerabilities for particular network components before the vulnerabilities are identified and remediation begins. It should be understood that the rolling network component exceptions are described in further detail with respect to U.S. patent application Ser. No. 15/889,799 entitled "Exception Remediation Logic Rolling Platform" filed concurrently herewith, which is incorporated by reference in its entirety herein.

FIG. 2 further illustrates in block 170 that monitoring and/or reporting of the triggering, remediation exception requests, and/or rolling exceptions or suppression for the vulnerabilities of the network components are continued until the network components are removed and/or the rolling exceptions or suppressions are rescinded (e.g., no longer exceptions or suppression is no longer required due to remediation of the vulnerability, change in organization policies, or the like).

Figure 3:
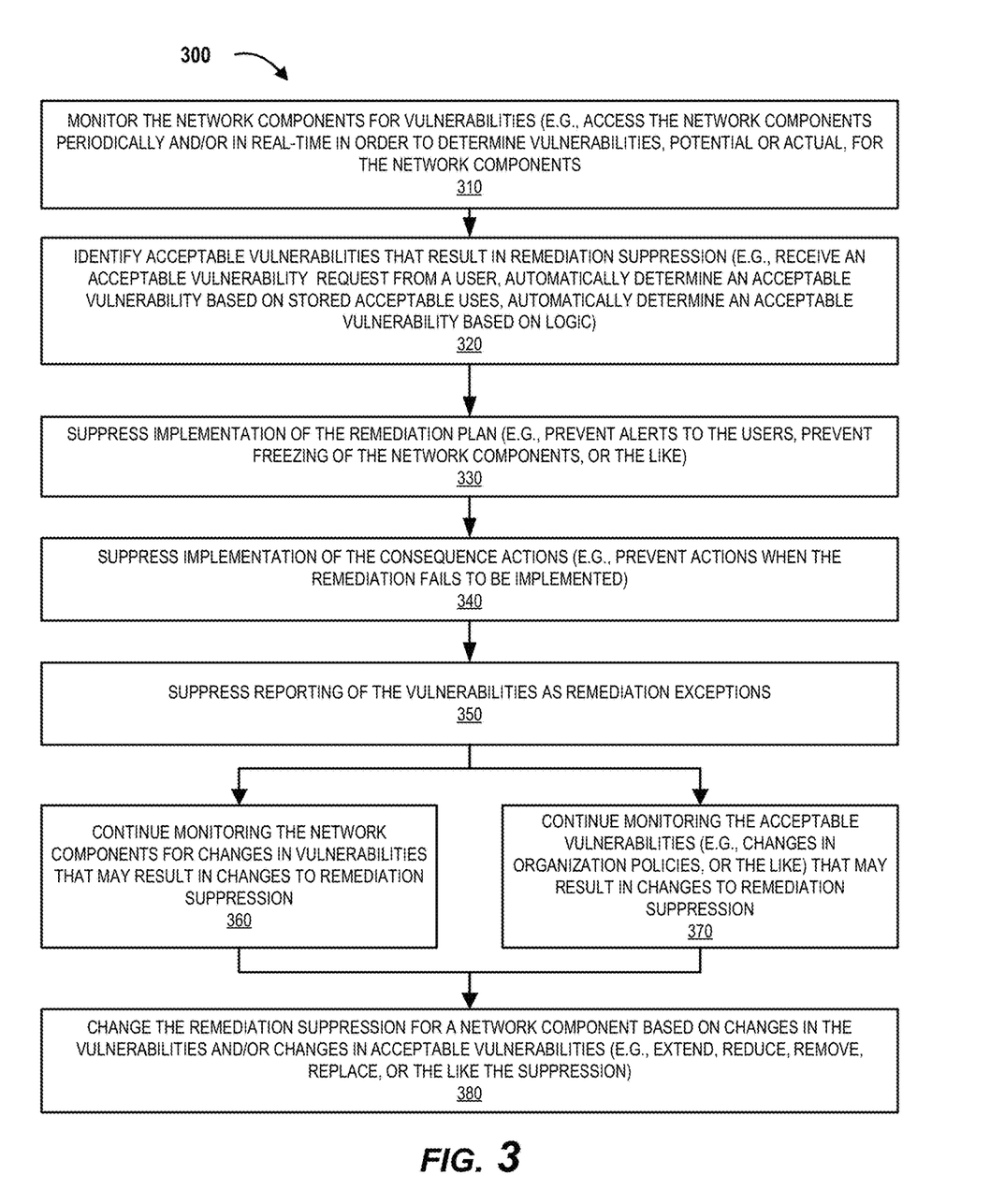
FIG. 3 illustrates a remediation suppression process, in accordance with embodiments of the invention.

FIG. 3 illustrates remediation suppression for acceptable vulnerabilities, as previously described with respect to block 160 in FIG. 2. As illustrated by block 310 in FIG. 3 the network components are monitored for vulnerabilities. It should be understood that the network components may be monitored in real-time or periodically by accessing the network component remotely and monitoring actions taken by the users 4 of the network component and/or the operation of the network component. Alternatively, the network components (e.g., devices and/or application) may store network component information (e.g., network device information, network application information, user information, such as user actions), and send such network component information to the organization system 10 or allow the organization systems 10 to access the network component information. As such, in some embodiments of the invention, the organization systems 10 (e.g., directly or through the use of the user computer systems) create a link with the network devices 20 and/or third-party systems 30 (e.g., if the third party is providing the network component) in order to monitor the network devices 20. Regardless of how the network components are monitored, the monitoring may result in the identification of vulnerabilities for the network components. For example, the monitoring may identify viruses, unauthorized access, spyware, or other like vulnerabilities on the network component, and/or may identify operation of the network components that does not meet organization policies, such as unauthorized applications that were downloaded, unauthorized use, unauthorized data transfer, or the like by users 4.

Block 320 of FIG. 3 further illustrates that acceptable vulnerabilities are identified, which result in remediation suppression (otherwise described herein as acceptable uses). Any identified vulnerabilities may be determined to be acceptable in a number of ways. In one instance the organization systems 10 may identify logic to identify that the vulnerability is actually acceptable, such as identifying that while operation of a network component may technically fail to meet company policies, the operation may be required in order for the network component to operate properly (e.g., the network component may communicate with a restricted third-party application that may be necessary for the operation of the network component). As such, in some embodiments the logic may atomically identify that the vulnerability is an acceptable vulnerability. In other examples, an acceptable vulnerability may be determined when a user requested an exception and the exception was granted, as described with respect to the remediation exception routing process previously described with respect to block 150 in FIG. 2. For example, a user 4 may determine that the remediation plan cannot be implemented within the remediation deadline, and thus, the user requests that the remediation should be tagged as an exception. If the request is approved, the vulnerability is tagged for remediation suppression and the system identifies that the vulnerability is temporarily acceptable. In other embodiments, logic functions may identify that the remediation plan has a deadline that cannot be meet because vulnerabilities are more complicated than the remediation plan accounted for. For example, a remediation plan may require a software update that will not be available until after the remediation deadline has passed, and in response the vulnerability identified may be identified as temporarily acceptable. Regardless of how the vulnerability is determined to be acceptable, the vulnerability may be tagged for remediation suppression.

In response to identifying that the vulnerability is an acceptable vulnerability, and thus subject to remediation suppression, the vulnerability, network component, and/or users 4 may be marked as exceptions, indicating that the remediation of the vulnerability may be suppressed in various ways as will be discussed in further detail with respect to blocks 330 to 350. As illustrated by block 330, when the vulnerability is identified as acceptable, the implementation of at least a part of the remediation plan may be suppressed. For example, the alerts that should be sent to the users 4 for the remediation plan are suspended. Additionally, the automatic implementation of portions of the remediation plan, such as automatic software updates, preventing operation of at least a portion of the operation of the network components, or the like may be suspended. Alternatively, the remediation may still be implemented, but the remediation deadline may be suppressed in order to prevent false notifications of the failure to meet the remediation deadline.

Block 340 further illustrates that the implementation of any of the consequence actions may be suppressed. For example, any of the actions that are typically undertaken when a remediation plan is not implemented (e.g., when remediation does not occur before the remediation deadline, user 4 does not respond to alerts that were not sent, user does not update the applications, or the like) may be suppressed to prevent implementation of the actions. As such, the remediation suppression may prevent the removal the network component. It should be understood that removal may include the organization systems 10 (e.g., directly or through user computer systems) accessing (e.g., logging into, pushing, or the like) the network component to instruct the network component to power down, removing a network application from the network device, changing the login credentials of a user 4 to prevent user access, changing the network 2 information to prevent the network component from accessing the network 2, electronically altering the network component so that it cannot function, or the like.

As illustrated by block 350, in addition to suppressing the implementation of the remediation plan and/or the consequence actions, reporting of the vulnerability may be suppressed so as to prevent false positives for reporting the vulnerability that has been identified as acceptable. As such, the vulnerability will not be reported as a vulnerability for remediation. In this way, the organization systems 10 monitoring the vulnerabilities will not mistake an allowed vulnerability for a vulnerability that requires remediation.

In order to store information regarding the network components, vulnerabilities, and/or users that are subject to remediation suppression, suppression data may be coupled to the network components. For example, the suppression data may include associating metadata with the network component, storing the network component and associated remediation suppression in a network component suppression list with other suppression data, or the like.

FIG. 3 further illustrates in block 360 that the organization system (e.g., directly and/or through a user 4 using the user computer systems) continues to monitor the network components and/or vulnerabilities to determine if additional remediation suppression should be implemented. The organization may monitor the network components as previously discussed with respect to blocks 310 and/or 320. It should be understood that the network components may change over time, which may result in new vulnerabilities, and/or changes may occur (e.g., to network components and/or organization policies) that would make currently identified vulnerabilities potentially acceptable vulnerabilities.

Alternatively, as illustrated in block 370 of FIG. 3 the organization (e.g., directly through the organization systems 10, or indirectly through the user computer systems) continues monitoring the acceptable vulnerabilities that are subject to the remediation suppression. The network components and/or the occurrence of vulnerabilities in such network components may have changed, which may result in the removal of the remediation suppression and/or changes to the remediation suppression (e.g., allow implementation of the remediation plan, but suppress the exception deadline, and/or other remediation suppression changes). For example, the network components may have been removed and/or changed for unrelated reasons, and as such the vulnerabilities may no longer exist and/or may no longer violate organization policies. In other examples, the organization policies may have changed such that the acceptable vulnerability may no longer be acceptable, and thus, the exception should be removed.

In some embodiments of the invention, each network component and organization policy is tagged with the associated remediation suppression. As such, anytime there is a change in the network component and/or the organization policy each of the tagged remediation suppressions are automatically reviewed in order to determine if the changes in the network components and/or the organization policy that affect the remediation suppression.

In response to identifying new vulnerabilities that may be acceptable as discussed with respect to block 360, or that there are changes in the acceptable vulnerabilities as discussed with respect to block 370, new remediation suppressions may be added, the remediation suppressions may be changed, and/or the remediation suppressions may be removed, as illustrated by block 380. For example, in some embodiments the remediation suppressions may be changed because the vulnerability no longer exists (e.g., the network component is no longer exposed to the vulnerability, the organization policies have changed such that the network component no longer has a vulnerability, or the like), or in other embodiments the vulnerability may no longer qualify for remediation suppression, and instead may now be a vulnerability that should be remediated. As such, in some embodiments the remediation plan, consequence actions, and/or reporting (or portions of each) may be implemented, changed, or suppressed. In some embodiments, when remediation suppression is removed the network components are returned for remediation, as previously discussed with respect to block 140 of FIG. 2.

It should be understood, that the systems described herein may be configured to establish a communication link (e.g., electronic link, or the like) with each other in order to accomplish the steps of the processes described herein. The link may be an internal link within the same entity (e.g., within the same financial institution) or a link with the other entity systems. In some embodiments, the one or more systems may be configured for selectively responding to dynamic authentication inquires. These feeds of resource usage and availability may be provided via wireless network path portions through the Internet. When the systems are not providing data, transforming data, transmitting the data, and/or creating the reports, the systems need not be transmitting data over the Internet, although it could be. The systems and associated data for each of the systems may be made continuously available, however, continuously available does not necessarily mean that the systems actually continuously generate data, but that a systems are continuously available to perform actions associated with the systems in real-time (i.e., within a few seconds, or the like) of receiving a request for it. In any case, the systems are continuously available to perform actions with respect to the data, in some cases in digitized data in Internet Protocol (IP) packet format. In response to continuously receiving real-time data feeds from the various systems, the systems may be configured to update actions associated with the systems, as described herein.

Moreover, it should be understood that the process flows described herein include transforming the data from the different systems (e.g., internally or externally) from the data format of the various systems to a data format associated with a particular display. There are many ways in which data is converted within the computer environment. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may convert to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

As will be appreciated by one of skill in the art in view of this disclosure, embodiments of the invention may be embodied as an apparatus (e.g., a system, computer program product, and/or other device), a method, or a combination of the foregoing. Accordingly, embodiments of the invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the invention may take the form of a computer program product comprising a computer-usable storage medium having computer-usable program code/computer-readable instructions embodied in the medium (e.g., a non-transitory medium, or the like).

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the invention may be written in an object oriented, scripted or unscripted programming language such as Java, Pearl, Python, Smalltalk, C++ or the like. However, the computer program code/computer-readable instructions for carrying out operations of the invention may also be written in conventional procedural programming languages, such as the "C" programming language or similar programming languages.

Embodiments of the invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

Specific embodiments of the invention are described herein. Many modifications and other embodiments of the invention set forth herein will come to mind to one skilled in the art to which the invention pertains, having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

INCORPORATION BY REFERENCE

To supplement the present disclosure, this application further incorporates entirely by reference the following commonly assigned patent applications:

| U.S. patent application Ser. No. | Title | Filed On |
|---|---|---|
| 15/889,797 | VULNERABILITY CONSEQUENCE TRIGGERING SYSTEM FOR APPLICATION FREEZE AND REMOVAL | Concurrently herewith |
| 15/889,944 | NETWORK DEVICE OWNER IDENTIFICATION AND COMMUNICATION TRIGGERING SYSTEM | Concurrently herewith |
| 15/889,949 | EXCEPTION REMEDIATION LOGIC ROUTING AND SUPPRESSION PLATFORM | Concurrently herewith |
| 15/889,799 | EXCEPTION REMEDIATION LOGIC ROLLING PLATFORM | Concurrently herewith |

What is claimed is:

1. A system for suppressing remediation of vulnerabilities of network components based on acceptable vulnerabilities, the system comprising:
   one or more memories having computer readable code stored thereon; and
   one or more processors operatively coupled to the one or more memories, wherein the one or more processors are configured to execute the computer readable code to:
   monitor network components for vulnerabilities;
   identify a vulnerability, wherein the vulnerability is related to at least one of the network components;
   identify when the vulnerability is an acceptable vulnerability by determining when the vulnerability is acceptable based on organization policy, wherein determining when the vulnerability is acceptable based on organization policy further comprises:
      identifying that the vulnerability is necessary for operation of a limited number of the network components, wherein the limited number of the network components is less than a total of all the network components; and
      in response to identifying that the vulnerability is necessary for operation of the limited number of the network components, automatically identifying that the vulnerability is an acceptable vulnerability for the limited number of the network components;
   tag the limited number of the network components that has the acceptable vulnerability and the organization policy that allowed the acceptable vulnerability with a remediation suppression by applying a custom criteria tag indicating a rolling exception for the limited number the network components, wherein the rolling exception comprises a specific time period for remediation suppression based on the time the newly added network component is added;
   continue to monitor the network for one or more newly added network components with the same criteria as the limited number of the network components, and automatically applying the custom criteria tag indicating the rolling exception for the one or more newly added network components for inclusion in the limited number of the network components;
   suppress at least a portion of a remediation plan, a consequence action, or reporting for the acceptable vulnerability based on the remediation suppression for the limited number of the network components;
   continue monitoring the limited number of the network components and the organization policy;
   determine when the acceptable vulnerability is no longer acceptable based on a change in the organization policy or based on a change to the limited number of the network components;
   untag the remediation suppression from the limited number of the network components that had the acceptable vulnerability and the organization policy that allowed the acceptable vulnerability when the acceptable vulnerability is no longer acceptable based on the change in the organization policy or based on the change to the limited number of the network components; and
   allow the portion of the remediation plan, the consequence action, or the reporting of the vulnerability that was previously suppressed to occur.

2. The system of claim 1, wherein suppressing at least the portion of the reporting for the acceptable vulnerability comprises preventing reporting of the acceptable vulnerability in order to prevent a false reporting of the vulnerability.

3. The system of claim 1, wherein suppressing at least the portion of the remediation plan comprises suspending alerts to a primary user of the limited number of the network components impacted by the acceptable vulnerability.

4. The system of claim 1, wherein suppressing at least the portion of the remediation plan comprises altering a remediation deadline for remediating the acceptable vulnerability.

5. The system of claim 1, wherein suppressing at least the portion of the remediation plan comprises suspending prevention of operation of at least a portion of the limited number of the network components impacted by the acceptable vulnerability.

6. The system of claim 1, wherein suppressing implementation of the consequence action comprises suspending removal of the limited number of the networks components impacted by the acceptable vulnerability.

7. The system of claim 1, wherein determining when the vulnerability is the acceptable vulnerability comprises determining when a user exception request for the vulnerability has been approved.

8. The system of claim 1, wherein the one or more processors are configured to execute the computer readable code to:
   edit the remediation suppression when the change to the limited number of the network components or the change to the organization policy occurs, wherein editing the remediation suppression comprises changing the suppression of at least the portion of the remediation plan, the consequence action, or the reporting for the acceptable vulnerability.

9. The system of claim 1, wherein the one or more processors are configured to execute the computer readable code to:
   determine when the remediation suppression is untagged from the acceptable vulnerability,
   determine the remediation plan for the vulnerability for the at least one of the network components;
   implement the remediation plan for the at least one of the network components;
   monitor the at least one of the network components for compliance with the remediation plan;
   identify a trigger for implementing the consequence action for the at least one of the network components; and
   implement the consequence action for the at least one of the network components when the trigger is identified.

10. A computer implemented method for suppressing remediation of vulnerabilities of network components based on acceptable vulnerabilities, the method comprising:
    monitoring, by one or more processors, network components for vulnerabilities;
    identifying, by the one or more processors, a vulnerability, wherein the vulnerability is related to at least one of the network components;
    identifying, by the one or more processors, when the vulnerability is an acceptable vulnerability by determining when the vulnerability is acceptable based on organization policy, wherein determining when the vulnerability is acceptable based on organization policy further comprises:
       identifying that the vulnerability is necessary for operation of a limited number of the network components, wherein the limited number of the network components is less than a total of all the network components; and
       in response to identifying that the vulnerability is necessary for operation of the limited number of the network components, automatically identifying that the vulnerability is an acceptable vulnerability for the limited number of the network components;
    tagging, by the one or more processors, the limited number of the network components that has the acceptable vulnerability and the organization policy that allowed the acceptable vulnerability with a remediation suppression by applying a custom criteria tag indicating a rolling exception for the limited number the network components, wherein the rolling exception comprises a specific time period for remediation suppression based on the time the newly added network component is added;
    continue to monitor the network for one or more newly added network components with the same criteria as the limited number of the network components, and automatically applying the custom criteria tag indicating the rolling exception for the one or more newly added network components for inclusion in the limited number of the network components;
    suppressing, by the one or more processors, at least a portion of a remediation plan, a consequence action, or reporting for the acceptable vulnerability based on the remediation suppression for the limited number of the network components;
    continue monitoring, by the one or more processors, the limited number of the network components and the organization policy;
    determining, by the one or more processors, when the acceptable vulnerability is no longer acceptable based on a change in the organization policy or based on a change to the limited number of the network components;
    untagging, by the one or more processors, the remediation suppression from the limited number of the network components that had the acceptable vulnerability and the organization policy that allowed the acceptable vulnerability when the acceptable vulnerability is no longer acceptable based on the change in the organization policy or based on the change to the limited number of the network components; and
    allow the portion of the remediation plan, the consequence action, or the reporting of the vulnerability that was previously suppressed to occur.

11. The method of claim 10, wherein suppressing at least the portion of the reporting for the acceptable vulnerability comprises preventing reporting of the acceptable vulnerability in order to prevent a false reporting of the vulnerability.

12. The method of claim 10, wherein suppressing at least the portion of the remediation plan comprises suspending alerts to a primary user of the limited number of the network components impacted by the acceptable vulnerability, wherein suppressing at least the portion of the remediation plan comprises altering a remediation deadline for remediating the acceptable vulnerability, and wherein suppressing at least the portion of the remediation plan comprises suspending prevention of operation of at least a portion of the limited number of the network components impacted by the acceptable vulnerability.

13. The method of claim 10, wherein suppressing implementation of the consequence action comprises suspending removal of the limited number of the network components impacted by the acceptable vulnerability.

14. The method of claim 10, further comprising:
    editing, by the one or more processors, the remediation suppression when the change in the limited number of the network components or the change in the organization policy occurs, wherein editing the remediation suppression comprises changing the suppression of at least the portion of the remediation plan, the consequence action, or the reporting for the acceptable vulnerability.

15. The method of claim 10, further comprising:
    determining, by the one or more processors, when the remediation suppression is untagged from the acceptable vulnerability;

determining, by the one or more processors, the remediation plan for the vulnerability for the limited number of the network components;

implementing, by the one or more processors, the remediation plan for the limited number of the network components;

monitoring, by the one or more processors, the at least one of the network components for compliance with the remediation plan;

identifying, by the one or more processors, a trigger for implementing the consequence action for the limited number of the network components; and implementing, by the one or more processors, the consequence action for the limited number of the network components when the trigger is identified.

16. A computer program product for suppressing remediation of vulnerabilities of network components based on acceptable vulnerabilities, the computer program product comprising at least one non-transitory computer-readable medium having computer-readable program code portions embodied therein, the computer-readable program code portions comprising:

an executable portion configured to monitor network components for vulnerabilities;

an executable portion configured to identify a vulnerability, wherein the vulnerability is related to at least one of the network components;

an executable portion configured to identify when the vulnerability is an acceptable vulnerability by determining when the vulnerability is acceptable based on organization policy, wherein determining when the vulnerability is acceptable based on organization policy further comprises:

identifying that the vulnerability is necessary for operation of a limited number of the network components, wherein the limited number of the network components is less than a total of all the network components; and in response to identifying that the vulnerability is necessary for the operation of the limited number of the network components, automatically identifying that the vulnerability is an acceptable vulnerability for the limited number of the network components;

an executable portion configured to tag the limited number of the network components that has the acceptable vulnerability and the organization policy that allowed the acceptable vulnerability with a remediation suppression by applying a custom criteria tag indicating a rolling exception for the limited number the network components, wherein the rolling exception comprises a specific time period for remediation suppression based on the time the newly added network component is added;

an executable portion configured to continue to monitor the network for one or more newly added network components with the same criteria as the limited number of the network components, and automatically applying the custom criteria tag indicating the rolling exception for the one or more newly added network components for inclusion in the limited number of the network components;

an executable portion configured to suppress at least a portion of a remediation plan, a consequence action, or reporting for the acceptable vulnerability based on the remediation suppression for the limited number of the network components; and an executable portion configured to continue monitoring the limited number of the network components and the organization policy;

an executable portion configured to determine when the acceptable vulnerability is no longer acceptable based on a change in the organization policy or based on a change to the limited number e of the network components;

an executable portion configured to untag the remediation suppression from the limited number of the network components that had the acceptable vulnerability and the organization policy that allowed the acceptable vulnerability when the acceptable vulnerability is no longer acceptable based on the change in the organization policy or based on the change to the limited number of the network components; and allow the portion of the remediation plan, the consequence action, or the reporting of the vulnerability that was previously suppressed to occur.

17. The computer program product of claim 16, wherein suppressing at least the portion of the reporting for the acceptable vulnerability comprises preventing reporting of the acceptable vulnerability in order to prevent a false reporting of the vulnerability.

18. The computer program product of claim 16, wherein suppressing at least the portion of the remediation plan comprises suspending alerts to a primary user of the limited number of the network components impacted by the acceptable vulnerability, wherein suppressing at least the portion of the remediation plan comprises altering a remediation deadline for remediating the acceptable vulnerability, and wherein suppressing at least the portion of the remediation plan comprises suspending prevention of operation of at least a portion of the limited number of the network components impacted by the acceptable vulnerability.

19. The computer program product of claim 16, wherein suppressing implementation of the consequence action comprises suspending removal of the limited number of the network components impacted by the acceptable vulnerability.

20. The computer program product of claim 16, wherein the computer-readable program code portions further comprise:

an executable portion configured to determine when the remediation suppression is untagged from the acceptable vulnerability;

an executable portion configured to determine the remediation plan for the vulnerability for the limited number of the network components;

an executable portion configured to implement the remediation plan for the at least one limited number of the network components;

an executable portion configured to monitor the at least one of the network components for compliance with the remediation plan;

an executable portion configured to identify a trigger for implementing the consequence action for the limited number of the network components; and an executable portion configured to implement the consequence action for the limited number of the network components when the trigger is identified.

* * * * *